(12) United States Patent
Shaffer et al.

(10) Patent No.: US 7,260,632 B2
(45) Date of Patent: Aug. 21, 2007

(54) PRESENCE-BASED MANAGEMENT IN A COMMUNICATION NETWORK

(75) Inventors: Shmuel Shaffer, Palo Alto, CA (US); Labhesh Patel, Mountain View, CA (US); Cullen F. Jennings, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 417 days.

(21) Appl. No.: 10/807,784

(22) Filed: Mar. 23, 2004

(65) Prior Publication Data

US 2005/0213563 A1    Sep. 29, 2005

(51) Int. Cl.
*G06F 15/173* (2006.01)

(52) U.S. Cl. .................. 709/224; 709/223; 709/217

(58) Field of Classification Search .............. 709/224, 709/223, 225, 203, 217, 219, 204, 206, 227
See application file for complete search history.

(56) References Cited

U.S. PATENT DOCUMENTS

| 6,658,095 B1 * | 12/2003 | Yoakum et al. ........ 379/93.01 |
| 7,020,480 B2 * | 3/2006 | Coskun et al. ............ 455/466 |
| 2004/0003046 A1 * | 1/2004 | Grabelsky et al. ......... 709/206 |

OTHER PUBLICATIONS

U.S. Appl. No. 10/428,401, entitled "Method and System for Automatic Contact Distribution Utilizing Presence Detection," filed May 2, 2003, specification 30 pages, formal figures 2 pages.
U.S. Appl. No. 10/649,452, entitled "Method and System for Managing Calls of an Automatic Call Distributor," filed Aug. 25, 2003, specification 34 pages, formal figures 2 pages.
U.S. Appl. No. 10/649,517, entitled "Method and System for Utilizing Proxy Designation in a Call System," filed Aug. 25, 2003, specification 43 pages, formal figures 2 pages.
J. Peterson et al., NeuStar, "Trait-Based Authorization Requirements for the session Initiation Protocol (SIP)," Sep. 2003, pp. 1-13.

* cited by examiner

*Primary Examiner*—Ario Etienne
*Assistant Examiner*—LaShonda Jacobs
(74) *Attorney, Agent, or Firm*—Baker Botts L.L.P.

(57) ABSTRACT

In one embodiment, a method for presence-based management in a communication network includes, using IM, discovering one or more network devices in a communication network. The network devices couple two or more endpoints to each other and enable communication between a first one of the endpoints and one or more second ones of the endpoints. The method also includes, using IM, obtaining presence information on the discovered network devices from the discovered network devices and, using the presence information on the discovered network devices from the discovered network devices, maintaining presence data associated with the discovered network devices.

25 Claims, 2 Drawing Sheets

PRESENCE-BASED MANAGEMENT IN A COMMUNICATION NETWORK

TECHNICAL FIELD OF THE INVENTION

This invention relates generally to communication networks and more particularly to presence-based management in a communication network.

BACKGROUND

Applications and devices in a communication network are typically managed according to one or more of the following protocols: Telnet; Security Shell (SSH); Hypertext Transfer Protocol (HTTP); Simple Object Access Protocol (SOAP); Common Open Policy Service Protocol for Policy Provisioning (COPS-PR); Cisco Discovery Protocol (CDP); and Simple Network Management Protocol (SNMP). However, these protocols have drawbacks. These protocols usually require at least certain dedicated network infrastructure. In addition, according to these protocols, a network manager often has to communicate more or less directly with each network device being managed. CDP typically enables discovery on only a single network segment, and SNMP does not readily enable management of multiple applications at a single network device.

SUMMARY OF THE INVENTION

According to the present invention, disadvantages and problems associated with managing a communication network may be reduced or eliminated.

In one embodiment, a method for presence-based management in a communication network includes, using IM, discovering one or more network devices in a communication network. The network devices couple two or more endpoints to each other and enable communication between a first one of the endpoints and one or more second ones of the endpoints. The method also includes, using IM, obtaining presence information on the discovered network devices from the discovered network devices and, using the presence information on the discovered network devices from the discovered network devices, maintaining presence data associated with the discovered network devices.

Particular embodiments of the present invention may provide one or more technical advantages. Particular embodiments may facilitate more secure network management. Particular embodiments may facilitate more robust network management. Particular embodiments may enable discovery on multiple network segments. In particular embodiments, one or more first services at a single network device may each be identified and managed separate from one or more second services at the network device. In particular embodiments, dedicated network infrastructure need not be used for network management. Particular embodiments may simplify implementation of a network-management system in a communication network. Particular embodiments may provide, in a single network-management system, functionality for discovery, rendezvousing, naming, asynchronous notification, provisioning, and device monitoring. In particular embodiments, a single network-management system may span multiple trust domains, which may be particularly important in networking environments with outsourced and distributed networks and virtual networks.

Certain embodiments may provide all, some, or none of these technical advantages. Certain embodiments may provide one or more other technical advantages, one or more of which may be readily apparent to those skilled in the art from the figures, descriptions, and claims herein.

BRIEF DESCRIPTION OF THE DRAWINGS

To provide a more complete understanding of the present invention and the features and advantages thereof, reference is made to the following description, taken in conjunction with the accompanying drawings, in which.

DESCRIPTION OF EXAMPLE EMBODIMENTS

Figure 1:
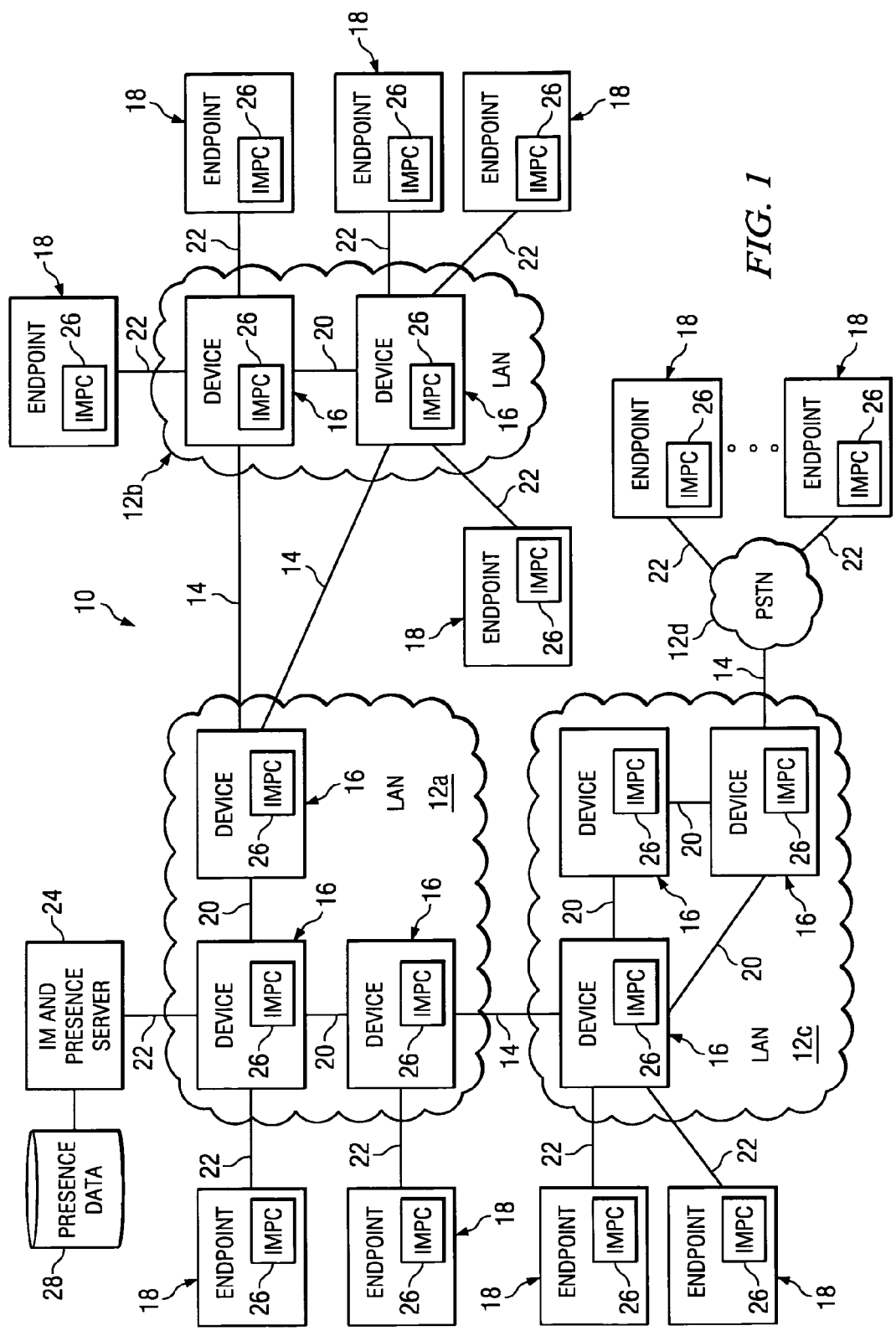
FIG. 1 illustrates an example system for presence-based management in a communication network.

FIG. 1 illustrates an example system 10 for presence-based management in a communication network 12. Communication networks 12a, 12b, and 12c are local area networks (LANs). Communication network 12d is a public switched telephone network (PSTN). Communication networks 12 are coupled to each other using network links 14 that may each include one or more LANs, wide area networks (WANs), metropolitan area networks (MANs), portions of the Internet, PSTNs, or other network links 14 or a combination of two or more such network links 14. In particular embodiments, a contact admission control (CAC) system is used to monitor bandwidth availability over a WAN coupling two or more communication networks 12 to each other. Although a particular number of particular communication networks 12 coupled to each other according to a particular arrangement are illustrated and described, the present invention contemplates any suitable number of any suitable communication networks 12 coupled to each other according to any suitable arrangement. Although communication networks 12 are illustrated and described as being more or less separate from each other, the present invention also contemplates two or more communication networks 12 being combined with each other in a suitable manner. In addition, a single communication network 12 may encompass multiple communication networks 12. As an example and not by way of limitation, in particular embodiments, a single communication network 12 includes communication networks 12a, 12b, 12c, and 12d and network links 14 coupling communication networks 12a, 12b, 12c, and 12d to each other.

One or more portions of a communication network 12 may be associated with a particular enterprise or other organization. Another organization may operate one or more such portions of communication network 12 according to an outsourcing arrangement between the two organizations. In addition, one or more of portions of communication network 12 may include a private communication network 12, a virtual communication network 12, or both. One or more portions of communication network 12 may include one or more trust domains. One or more of portions of communication network 12 may be a distributed communication network 12.

A communication network 12 may include one or more network devices 16. A network device 16 includes one or more hardware components, software components, or embedded-logic components or a combination of two or more such components supporting communication among multiple endpoints 18. As an example and not by way of limitation, a network device 16 may include one or more network components, gatekeepers, contact managers, routers, hubs, switches, gateways, or endpoints 18 or a combination of two or more such devices. Network devices 16 in a communication network 12 may be coupled to each other according to any suitable arrangement using one or more network segments 20. As an example and not by way of limitation, network devices 16 in a communication network 12 may be coupled to each other according to a ring, mesh, or other topology using multiple network segments 20. A network segment 22 may include one or more communication networks 12, computer buses, wireline segments, optical segments, wireless segments, or other segments or a combination of two or more of such segments. Although particular communication networks 12 including particular numbers of particular network devices 16 coupled to each other according to particular arrangements using particular numbers of particular network segments 20 are illustrated and described, the present invention contemplates any suitable communication networks 12 including any suitable numbers of any suitable network devices 16 coupled to each other according to any suitable arrangements using any suitable numbers of any suitable network segments 20.

Communication networks 12 each have endpoints 18. An endpoint 18 includes one or more hardware components, software components, or embedded-logic components or a combination of two or more such components for communicating with one or more other endpoints 18. As an example and not by way of limitation, an endpoint 18 may include a phone (which may be a mobile or other phone), a computer, a personal digital assistant (PDA), a video monitor, a camera, a fax machine, or other device. In particular embodiments, an endpoint 18 may be an automatic contact distributor (ACD) coupled to one or more other endpoints 18. An ACD includes a specialized communication system for routing incoming contacts to available agents at endpoints 18 coupled to the ACD. The ACD may route incoming contacts so that they are properly distributed among available agents. A contact includes a request for service communicated using any audio and/or video means, including signals, data or messages transmitted through voice devices, text chat, web sessions, facsimile, instant messaging and e-mail.

An endpoint 18 may be coupled to a network device 16 in a communication network 12 using one or more endpoint links 22 that may each include one or more computer buses, LANs, MANs, WANs, or portions of the Internet or any other appropriate wireline, optical, wireless, or other endpoint links 22. Although endpoints 18 coupled to a communication network 12 are illustrated and described as being separate from communication network 12, communication network 12 may include one or more of endpoints 18. Endpoints 18 may communicate with each other using packets of data. A packet may include one or more packets, cells, frames, or other units of data. Data may include one or more data components, metadata components, executable software components, or other components.

Endpoints 18 may use one or more suitable communication protocols to communicate with each other. According to one or more such communication protocols, one or more endpoints 18 may each be identified using a unique address. In addition or as an alternative, one or more network devices 16 may each be identified using a unique address. As an example and not by way of limitation, in particular embodiments, two or more endpoints 18 may each be identified by an Internet Protocol (IP) address and may communicate with each other using IP. In these embodiments, one or more components of system 10 may support point-to-point, multicast, unicast, or other communication. One or more endpoints 18 and network devices 16 may support Voice over IP (VoIP) or Voice over Packet (VoP). To communicate using VoIP or VoP, an endpoint packetizes voice data into packets communicable over one or more packet-based communication networks 12. Endpoints 18 and network devices 16 that may support VoIP or VoP include telephones, fax machines, computers running telephony software, nodes, gateways, and other devices capable of providing telephony functionality over a packet-based communication network 12.

Communication between a first endpoint 18 and one or more second endpoints 18 may include one or more voice components, text components, executable software components, data components, or other components or a combination of two or more such components. As an example and not by way of limitation, a communication between a first endpoint 18 and one or more second endpoints 18 may include one or more instant messages (IMs). In addition to endpoints 18 communicating with each other using instant messaging (IM), one or more endpoints 18 may communicate with one or more network devices 16 using IM. One or more endpoints 18 and network devices 16 may support use of Session Initiation Protocol (SIP) for IM and possibly other functionality. In addition or as an alternative, one or more endpoints 18 and network devices 16 may support use of SIP for Instant Messaging and Presence-Leveraging Extensions (SIMPLE) Protocol. In system 10, one or more voice-enabled endpoints 18 may support use of SIP and presence-related applications. In addition or as a further alternative, one or more endpoints 18 and network devices 16 may support use of Instant Messaging and Presence Protocol (IMPP). As described below, IM and one or more of these or other IM-related protocols may be used for managing a communication network 12. Reference to "IM" may encompass both IM and one or more IM-related protocols. As described below, in particular embodiments, a SIP-enabled infrastructure may be used to manage one or more network devices 16 without the use of an additional protocol, such as CDP or SNMP.

Communication network 12a includes an IM and presence server 24 facilitating remote management of one or more network devices 16 in communication network 12a. Although IM and presence server 24 is described as facilitating management of one or more network devices 16 in communication network 12a, the present invention contemplates IM and presence server 24 facilitating management of one or more network devices 16 in any suitable communication network 12. As an example and not by way of limitation, in particular embodiments, IM and presence server 24 may facilitate management of one or more network devices 16 in a communication network 12 including communication networks 12a, 12b, 12c, and 12d. IM and presence server 24 may interact with IM and presence clients (IMPCs) 26 at network devices 16 and endpoints 18 to facilitate such management. An IMPC 26 may include one or more hardware components, software components, or embedded-logic components or a combination of two or more such components for interacting with IM and presence server 24. In particular embodiments, IM and presence server 24 may serve as a rendezvous point (which may be similar to a SIP registrar or proxy) for reporting faults at network devices 16, monitoring network devices 16, and provisioning requests to network devices 16, as described below. In addition, IM and presence server 24 may provide a rendezvous service enabling one or more users to remotely locate and manage one or more network devices 16 in communication network 12a. In particular embodiments, the rendezvous service may span multiple enterprises, trust domains, or both, which may enable a first entity (such as a first enterprise or a consultant) with suitable authorization to manage one or more network devices 16 associated with one or more second entities (such as a second enterprise).

In particular embodiments, IM and presence server 24 may discover network devices 16 in communication network 12a. As an example and not by way of limitation, in particular embodiments, after a network device 16 in communication network 12a boots up, an IMPC 26 at network device 16 automatically communicates a publish message (which may be an IM) to IM and presence server 24 identifying network device 16. The publish message discovers network device 16 to IM and presence server 24. In particular embodiments, network device 16 may be identified according to a hardware token or a software token at network device 16. Communication of the publish message from network device 16 to IM and presence server 24 may initiate a connection between network device 16 and IM and presence server 24 that may be used for reporting faults at network device 16, monitoring network device 16, and provisioning requests to network device 16. In particular embodiments, because network device 16 initiates this connection, IM and presence server 24 may detect network device 16 through one or more firewalls or network address translations (NATs). In particular embodiments, instead of IMPC 26 automatically communicating a publish message to IM and presence server 24 when network device 16 boots up, IMPC 26 may communicate a publish message to IM and presence server 24 in response to a discovery request (which may be an IM) from IM and presence server 24. In particular embodiments, IMPC 26 may respond to discovery requests from only certain IM and presence servers 24. As an example and not by way of limitation, in particular embodiments, network devices 16 from an equipment provider (such as, for example, CISCO SYSTEMS) may include IMPCs 26 that respond to discovery requests from only IM and presence servers 24 from the same equipment provider.

In particular embodiments, network devices 16 may be named according to equipment provider and product type. As an example and not by way of limitation, to communicate a publish message to IM and presence server 24, a network device 16 may use the user name "cisco-2600-gw21@acme.com." The "cisco" portion of the user name may indicate that CISCO SYSTEMS is an equipment provider of network device 16. The "2600" portion of the user name may indicate that network device 16 is a 2600 product, which may be a particular product type of CISCO SYSTEMS. The "gw21" portion may be a unique identifier of network device 16. In particular embodiments, as an alternative to the user name indicating the product type of network device 16, the publish message may include an Extensible Markup Language (XML) body that identifies the product type of network device 16. The XML body may also indicate a product version of network device 16, a software release of network device 16, or both. In particular embodiments, any authorized user at an endpoint 18 including an IMPC 26 may add "cisco-2600-gw21@acme.com" to a buddy list of the user and monitor the status of network device 16.

In addition, in particular embodiments, one or more services at network device 16 may each be named. As an example and not by way of limitation, using SIMPLE Protocol, a service at network device 16 may be named according to the nomenclature, "servicename@device_FQDN." A service at network device 16 may include one or more functionalities provided by network device 16 and may be implemented using one or more hardware components, software components, or embedded-logic components or a combination of two or more of such components.

In particular embodiments, IM and presence server 24 maintains presence data 28 associated with one or more network devices 16. Presence data 28 may include one or more records that each correspond to a network device 16. A record corresponding to a network device 16 may indicate a current presence status of network device 16, which may indicate a current level of service at network device 16. As an example and not by way of limitation, network device 16 may have a current presence status of "online," "in partial service," or "offline." If a current presence status of network device 16 changes, an IMPC 26 at network device 16 may automatically communicate an update message (which may be an IM) to IM and presence server 24 indicating the change. Network device 16 may use a serviceability, tracing, and logging code to formulate a status for reporting. In response to the update message, IM and presence server 24 may update a record in presence data 28 corresponding to network device 16 to indicate the change. In addition or as an alternative to a record in presence data 28 indicating a current presence status of a network device 16, the record may indicate a current presence or other status of each of one or more services at network device 16. An update message from network device 16 may indicate a change in current presence or other status of each of one or more services at network device 16.

As an example and not by way of limitation, a record corresponding to network device 16 may include a "current presence status" field. If a current presence status of network device 16 changes from "online" to "in partial service" as a result of a fault or other event at network device 16 (such as a network segment 20, network link 14, or endpoint link 22 being disconnected from network device 16), IMPC 26 may communicate an update message to IM and presence server 24 indicating the change. IM and presence server 24 may then change the value of the "current presence status" field in the record corresponding to network device 16 from "online" to "in partial service." In particular embodiments, in addition or as an alternative to an IMPC 26 at a network device 16 automatically communicating an update message to IM and presence server 24 if a current presence status of network device 16 changes, IMPC 26 may communicate an update message to IM and presence server 24 in response to an update request from IM and presence server 24. As described above with respect to discovery requests, IMPC 26 may in particular embodiments respond to update requests from only certain IM and presence servers 24. In particular embodiments, IMPC 26 may communicate update messages to IM and presence server 24 at predetermined times. As an example and not by way of limitation, IMPC 26 may communicate update messages to IM and presence server 24 at regular intervals. If a predetermined amount of time passes without IM and presence server 24 receiving an update message from IMPC 26, IM and presence server 24 may conclude that one or more faults have occurred at network device 16 and update a record in presence data 28 corresponding to network device 16 accordingly.

IM and presence server 24 may provide one or more network administrators or other users at one or more endpoints 18 access to presence data 28. Providing such access to presence data 28 may facilitate remote management of one or more network devices 16 in communication network 12a. As an example and not by way of limitation, one or more users may access presence data 28 to monitor one or more network devices 16 in communication network 12*a*. In particular embodiments, a user may access presence data 28 using IM, which may enable a user to access presence data 28 across one or more network boundaries (which may each include a boundary between two trust domains, a boundary between two private networks or between a private network and a public network, or other network boundary). As an example and not by way of limitation, in particular embodiments, a user at an endpoint 18 coupled to communication network 12*b* may, through IM and presence server 24 coupled to communication network 12*a*, access presence data 28 associated with communication network 12*a*.

In particular embodiments, a user may subscribe to status notifications from IM and presence server 24 regarding one or more network devices 16 in communication network 12*a*. As an example and not by way of limitation, a status notification may indicate a change in current presence status at a network device 16. To subscribe to status notifications from IM and presence server 24 regarding a network device 16, a user may communicate a subscription request to IM and presence server 24. In response to the subscription request, IM and presence server 24 may determine whether the user is authorized to receive the requested status notifications, as described more fully below. If IM and presence server 24 determines that the user is so authorized, IM and presence server 24 may add the user to an appropriate notification list at IM and presence server 24. When IM and presence server 24 receives update messages from network device 16 indicating changes in current presence status at network device 16, IM and presence server 24 may then communicate status notifications to the user indicating those changes. In particular embodiments, a status notification from IM and presence server 24 may include one or more update messages from one or more network devices 16 indicating one or more changes in current presence status at network devices 16.

In particular embodiments, a user at an endpoint 18 may provide input to and receive output from an IMPC 26 at endpoint 18 via a network-management application at endpoint 18. As an example and not by way of limitation, the network-management application may generate a graphical user interface (GUI) for providing input to and receiving output from IMPC 26 and present the GUI to the user. The GUI may be more or less user friendly. In particular embodiments, the GUI may resemble a GUI associated with one or more network-management systems (such as one or more SNMP-based network-management systems) known in the prior art. Such resemblance between the two GUIs may in effect hide IMPC 26 from the user so that the user is more or less unaware of network infrastructure associated with IMPC 26. In particular embodiments, the network-management application may reside at endpoint 18 at a layer above IMPC 26.

In particular embodiments, a user at an endpoint 18 may receive update messages directly from one or more network devices 16. To receive update messages directly from a network device 16, a user may communicate a subscription request to an IMPC 26 at network device 16. In response to the subscription request, IMPC 26 may determine whether the user is authorized to receive the requested update messages, as described more fully below. If IMPC 26 determines that the user is so authorized, IMPC 26 may add the user to an appropriate update list at network device 16 and, when a current presence status at network device 16 changes, communicate an update message to the user indicating the change.

A user at an endpoint 18 may request certain presence data 26 corresponding to a network device 16 from IM and presence server 24 or directly from network device 16. As an example and not by way of limitation, a user may communicate an update request to a network device 16 having the user name "cisco-2600-gw21@acme.com." The update request may include the request, "status gw21." In response to the update request, an IMPC 26 at network device 16 may communicate detailed status information regarding network device 16 to the user. As described more fully below, in particular embodiments, IMPC 26 may communicate the detailed status information regarding network device 16 to the user only if the user is authorized to receive such information. As another example, a user may communicate a notification request to IM and presence serve 22 including the request "status gw21." In response to the notification request, IM and presence server 24 may communicate detailed status information regarding network device 16 to the user. As described more fully below, in particular embodiments, IM and presence server 24 may communicate the detailed status information regarding network device 16 to the user only if the user is authorized to receive such information.

In particular embodiments, a user at an endpoint 18 may communicate instructions to a network device 16 to remotely manage network device 16. As an example and not by way of limitation, a user may communicate an IM to an IMPC 26 at a network device 16 including instructions directing network device 16 to, for example, reboot. The IM may include the instructions, "reboot gw21," for example. In response to the instructions, IMPC 26 may determine whether the user is authorized to direct network device 16 to reboot. If IMPC 26 determines that the user is so authorized, IMPC 26 or another device at network device 16 may cause network device 16 to reboot as directed. In addition or as an alternative to the user directly communicating such instructions to network device 16, the user may, in particular embodiments, communicate such instructions to network device 16 through IM and presence server 24. In these embodiments, before communicating the instructions to network device 16, IM and presence server 24 may determine whether the user is authorized to manage network device 16.

In particular embodiments, only an authorized user at an endpoint 18 may remotely manage a network device 16. Reference to "management" of a network device 16 encompasses monitoring network device 16, directing network device 16 to perform certain tasks, or both, where appropriate. Particular embodiments provide end-to-end security. As an example and not by way of limitation, a network device 16 may include a certificate and a public key (which may come from an equipment provider of network device 16). An IMPC 26 at network device 16 may use the certificate, the public key, or both to sign status or other information regarding network device 16 communicated from IMPC 26 to a user at an endpoint 18. The user may use the signature to verify the information. In addition or as an alternative, IMPC 26 may use the certificate, the public key, or both to encrypt the information. Such encryption may provide integrity protection to the information. In particular embodiments, a digest-style, shared-secret approach utilized in SIP may be used to authenticate a user at an endpoint 18 attempting to manage one or more network devices 16. A digest-style, shared-secret approach may facilitate identification of a user attempting to use a service. Such an approach may also facilitate identification of a provider of the service. A digest-style, shared-secret approach may use one or more passwords, private keys, or other shared secrets or a combination of two or more such shared secrets. In particular embodiments, a shared secret need not be exchanged to identify a user or a provider. The user or the provider may instead indicate that the user or the provider knows the shared secret. As an example and not by way of limitation, the user may encrypt a message using a private key and communicate the message to identify the user. In particular embodiments, a user may use one or more Secure Multipurpose Internet Mail Extensions (SMIMEs) to authenticate to IM and presence server 24 or a network device 16.

Security functionality in SIP, SIMPLE Protocol, or both may be used for authorization purposes at IM and presence server 24 or one or more IMPCs 26. In particular embodiments, IM and presence server 24 may determine whether a user at an endpoint 18 may subscribe to status notifications regarding a network device 16. In addition or as an alternative, a role-base authentication, authorization, and accounting (AAA) server may monitor watcher-information packages and automatically authorize any user having an administrative role with respect to a network device 16 to subscribe to status notifications regarding network device 16. In particular embodiments, authentication may be handled using one or more SMIME signatures in IMs between users and IM and presence server 24 and IMs between users and network devices 16. In particular embodiments, authentication may be handled using one or more SIP digests at one or more transport-layer security (TLS) transports. An SMIME signature on an IM from a user at an endpoint 18 to a network device 16 may be used to determine whether the is authorized to control or otherwise manage network device 16.

In particular embodiments, an intermediate device may sign an IM from a user at an endpoint 18 to authenticate the user. As an example and not by way of limitation, the user "bob_the_admin" may communicate an IM to an intermediate device providing an identity service. The intermediate device may determine whether "bob_the_admin" is authorized to assert the role "gw_admin." If "bob_the_admin" is so authorized, the intermediate device may sign the IM according to a "gw_admin" role and communicate the IM to a network device 16. Network device 16 may receive the IM and determine whether the IM bears a signature corresponding to the role "gw_admin." If the IM bears such a signature, network device 16 may accordingly respond to one or more instructions in the IM from the user.

Figure 2:
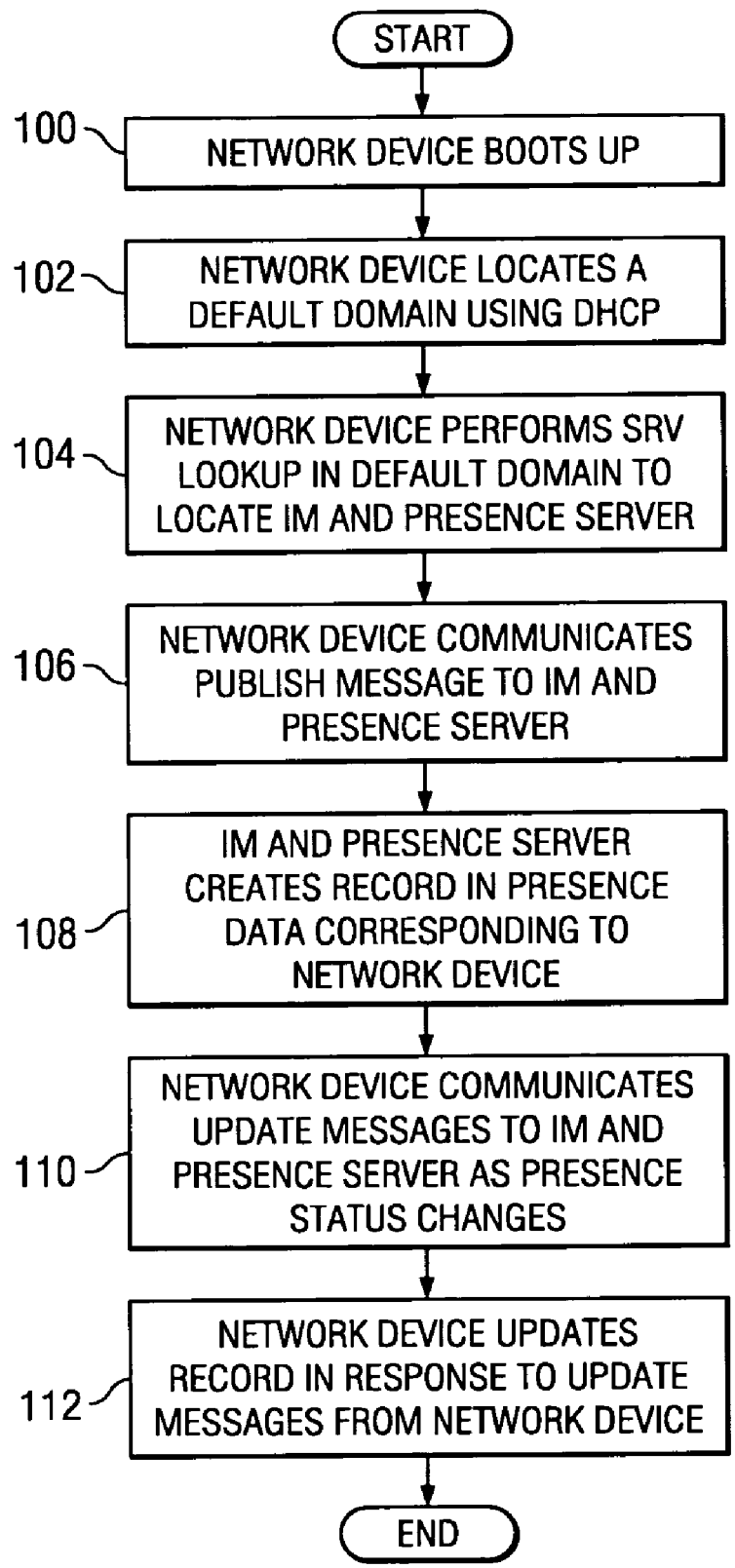
FIG. 2 illustrates an example method for presence-based management in a communication network.

FIG. 2 illustrates an example method for presence-based management in a communication network 12. The method begins at step 100, where a network device 16 boots up. At step 102, using Dynamic Host Configuration Protocol (DHCP) network device 16 locates a default domain. At step 104, network device 16 performs a service location (SRV) lookup in the default domain. At step 106, network device 16 communicates a publish message to IM and presence server 24. At step 108, IM and presence server 24 creates a record in presence data 28 corresponding to network device 16. At step 110, network device 16 communicates update messages to IM and presence server as current presence status at network device 16 changes. At step 112, IM and presence server 24 updates the record in presence data 28 corresponding to network device 16 in response to the update messages from network device 16, at which point the method ends.

Although the present invention has been described with several embodiments, myriad changes, variations, alterations, transformations, and modifications may be suggested to one skilled in the art, and it is intended that the present invention encompass such changes, variations, alterations, transformations, and modifications as fall within the scope of the appended claims. The present invention is not intended to be limited, in any way, by any statement in the specification that is not reflected in the claims.

What is claimed is:

1. A system for presence-based management in a communication network, the system comprising:
    an instant messaging (IM) and presence server coupled to one or more network devices in a communication network, the network devices coupling two or more endpoints to each other and enabling communication between a first one of the endpoints and one or more second ones of the endpoints, the IM and presence server being operable to:
    using IM, discover one or more of the network devices;
    using IM, obtain presence information on the discovered network devices from the discovered network devices; and
    using the presence information on the discovered network devices from the discovered network devices, maintain presence data associated with the discovered network devices, wherein an authorized user at an endpoint is able, using IM, to instruct one or more discovered network devices to perform one or more particular tasks, the presence server providing a rendezvous service enabling one or more users to remotely locate and manage one or more of the network devices in the communication network, the rendezvous service spanning multiple trust domains, which enables a first entity with suitable authorization to manage one or more of the network devices associated with one or more second entities, wherein an authorized user at an endpoint is able to manage one or more discovered network devices using an IM and presence client (IMPC) at the endpoint, the authorized user providing input to and receiving output from the IMPC via a network-management application operable to generate a graphical user interface (GUI) for managing the one or more discovered network devices.

2. The system of claim 1, wherein presence information on a discovered network device indicates a current presence status of the discovered network device.

3. The system of claim 1, wherein:
    the IM and presence server and one or more of the network devices support one or more of Session Initiation Protocol (SIP) and SIP for Instant Messaging and Presence-Leveraging Extensions (SIMPLE) Protocol; and
    the IM and presence server uses SIP, SIMPLE Protocol, or both to discover one or more of the network devices and obtain presence information on the discovered network devices from the discovered network devices.

4. The system of claim 1, wherein, using IM, a network device automatically communicates a publish message to the IM and presence server in response to the network device booting up, the publish message discovering the network device to the IM and presence server.

5. The system of claim 1, wherein, using IM, a network device communicates a publish message to the IM and presence server in response to a discovery request from the IM and presence server, the publish message discovering the network device to the IM and presence server.

6. The system of claim 1, wherein:
    an authorized user at an endpoint is able to subscribe to status notifications on one or more discovered network devices from the IM and presence server, a status notification comprising presence information on one or more discovered network devices;

the IM and presence server communicating the status notifications to the user at the endpoint using IM.

7. The system of claim 1, wherein an authorized user at an endpoint is able, using IM, to obtain presence information on a discovered network device from the discovered network device.

8. The system of claim 1, wherein an authorized user at an endpoint is able, using IM, to manage one or more discovered network devices across one or more network boundaries between the endpoint and the one or more network devices.

9. A method for presence-based management in a communication network, the method comprising:

using IM, discovering one or more network devices in a communication network, the network devices coupling two or more endpoints to each other and enabling communication between a first one of the endpoints and one or more second ones of the endpoints;

using IM, obtaining presence information on the discovered network devices from the discovered network devices; and using the presence information on the discovered network devices from the discovered network devices, maintaining presence data associated with the discovered network devices, wherein an authorized user at an endpoint is able, using IM, to instruct one or more discovered network devices to perform one or more particular tasks, the presence server providing a rendezvous service enabling one or more users to remotely locate and manage one or more of the network devices in the communication network, the rendezvous service spanning multiple trust domains, which enables a first entity with suitable authorization to manage one or more of the network devices associated with one or more second entities, wherein an authorized user at an endpoint is able to manage one or more discovered network devices using an IM and presence client (IMPC) at the endpoint, the authorized user providing input to and receiving output from the IMPC via a network-management application operable to generate a graphical user interface (GUI) for managing the one or more discovered network devices.

10. The method of claim 9, wherein presence information on a discovered network device indicates a current presence status of the discovered network device.

11. The method of claim 9, wherein using IM comprises using one or more of Session Initiation Protocol (SIP) and SIP for Instant Messaging and Presence-Leveraging Extensions (SIMPLE) Protocol.

12. The method of claim 9, wherein discovering a network device comprises the network device using IM to automatically communicate a publish message to an IM and presence server in response to the network device booting up, the publish message discovering the network device to the IM and presence server.

13. The method of claim 9, wherein discovering a network device comprises the network device using IM to communicate a publish message to an IM and presence server in response to a discovery request from the IM and presence server, the publish message discovering the network device to the IM and presence server.

14. The method of claim 9, comprising:

an authorized user at an endpoint subscribing to status notifications on one or more discovered network devices from an IM and presence server, a status notification comprising presence information on one or more discovered network devices; and communicating the status notifications to the user at the endpoint using IM.

15. The method of claim 9, comprising an authorized user at an endpoint using IM to instruct one or more discovered network devices to perform one or more particular tasks.

16. The method of claim 9, comprising an authorized user at an endpoint using IM to manage one or more discovered network devices across one or more network boundaries between the endpoint and the one or more network devices.

17. Logic for presence-based management in a communication network, the logic embedded in a network device and when executed operable to:

using IM, discover one or more network devices in a communication network, the network devices coupling two or more endpoints to each other and enabling communication between a first one of the endpoints and one or more second ones of the endpoints;

using IM, obtain presence information on the discovered network devices from the discovered network devices; and using the presence information on the discovered network devices from the discovered network devices, maintain presence data associated with the discovered network devices, wherein an authorized user at an endpoint is able, using IM, to instruct one or more discovered network devices to perform one or more particular tasks, the presence server providing a rendezvous service enabling one or more users to remotely locate and manage one or more of the network devices in the communication network, the rendezvous service spanning multiple trust domains, which enables a first entity with suitable authorization to manage one or more of the network devices associated with one or more second entities, wherein an authorized user at an endpoint is able to manage one or more discovered network devices using an IM and presence client (IMPC) at the endpoint, the authorized user providing input to and receiving output from the IMPC via a network-management application operable to generate a graphical user interface (GUI) for managing the one or more discovered network devices.

18. The logic of claim 17, wherein presence information on a discovered network device indicates a current presence status of the discovered network device.

19. The logic of claim 17, wherein using IM comprises using one or more of Session Initiation Protocol (SIP) and SIP for Instant Messaging and Presence-Leveraging Extensions (SIMPLE) Protocol.

20. The logic of claim 17, wherein discovering a network device comprises the network device using IM to automatically communicate a publish message to an IM and presence server in response to the network device booting up, the publish message discovering the network device to the IM and presence server.

21. The logic of claim 17, wherein discovering a network device comprises the network device using IM to communicate a publish message to an IM and presence server in response to a discovery request from the IM and presence server, the publish message discovering the network device to the IM and presence server.

22. The logic of claim 17:

enabling an authorized user at an endpoint to subscribe to status notifications on one or more discovered network devices, a status notification comprising presence information on one or more discovered network devices; and being operable to communicate the status notifications to the user at the endpoint using IM.

23. The logic of claim 17, wherein an authorized user at an endpoint is able, using IM, to manage one or more discovered network devices across one or more network boundaries between the endpoint and the one or more network devices.

24. A system for presence-based management in a communication network, the system comprising:

means for, using IM, discovering one or more network devices in a communication network, the network devices coupling two or more endpoints to each other and enabling communication between a first one of the endpoints and one or more second ones of the endpoints;

means for, using IM, obtaining presence information on the discovered network devices from the discovered network devices; and means for, using the presence information on the discovered network devices from the discovered network devices, maintaining presence data associated with the discovered network devices, wherein an authorized user at an endpoint is able, using IM, to instruct one or more discovered network devices to perform one or more particular tasks, the presence server providing a rendezvous service enabling one or more users to remotely locate and manage one or more of the network devices in the communication network, the rendezvous service spanning multiple trust domains, which enables a first entity with suitable authorization to manage one or more of the network devices associated with one or more second entities, wherein an authorized user at an endpoint is able to manage one or more discovered network devices using an IM and presence client (IMPC) at the endpoint, the authorized user providing input to and receiving output from the IMPC via a network-management application operable to generate a graphical user interface (GUI) for managing the one or more discovered network devices.

25. A system for presence-based management in a communication network, the system comprising:

an instant messaging (IM) and presence server coupled to one or more network devices in a communication network, the network devices coupling two or more endpoints to each other and enabling communication between a first one of the endpoints and one or more second ones of the endpoints, the IM and presence server being operable to:

using IM and one or more of Session Initiation Protocol (SIP) and SIP for Instant Messaging and Presence-Leveraging Extensions (SIMPLE) Protocol, discover one or more of the network devices;

using IM and one or more of SIP and SIMPLE Protocol, obtain presence information on the discovered network devices from the discovered network devices, presence information on a discovered network device indicating a current presence status of the discovered network device; and using the presence information on the discovered network devices from the discovered network devices, maintain presence data associated with the discovered network devices, wherein an authorized user at an endpoint is able, using IM, to instruct one or more discovered network devices to perform one or more particular tasks, the presence server providing a rendezvous service enabling one or more users to remotely locate and manage one or more of the network devices in the communication network, the rendezvous service spanning multiple trust domains, which enables a first entity with suitable authorization to manage one or more of the network devices associated with one or more second entities, wherein an authorized user at an endpoint is able to manage one or more discovered network devices using an IM and presence client (1MPG) at the endpoint, the authorized user providing input to and receiving output from the IMPC via a network-management application operable to generate a graphical user interface (GUI) for managing the one or more discovered network devices.

* * * * *